US012761081B2

(12) United States Patent
Ohura et al.

(10) Patent No.: US 12,761,081 B2
(45) Date of Patent: Oct. 13, 2026

(54) MULTILAYER BODY, ELECTRONIC DEVICE, AND METHOD OF PRODUCING MULTILAYER BODY

(71) Applicant: Panasonic Intellectual Property Management Co., Ltd., Osaka (JP)

(72) Inventors: Kosei Ohura, Osaka (JP); Naoki Tambo, Kyoto (JP); Kouhei Takahashi, Osaka (JP); Masaki Fujikane, Osaka (JP); Hiroyuki Tanaka, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 399 days.

(21) Appl. No.: 18/471,081

(22) Filed: Sep. 20, 2023

(65) Prior Publication Data

US 2024/0011840 A1 Jan. 11, 2024

Related U.S. Application Data

(63) Continuation of application No. PCT/JP2022/009787, filed on Mar. 7, 2022.

(30) Foreign Application Priority Data

Mar. 24, 2021 (JP) ................................ 2021-050677

(51) Int. Cl.
*G01J 5/10* (2006.01)

(52) U.S. Cl.
CPC ...................................... *G01J 5/10* (2013.01)

(58) Field of Classification Search
CPC .................................. B82Y 20/00; G01J 5/10
See application file for complete search history.

(56) References Cited

U.S. PATENT DOCUMENTS

| | | | | |
|---|---|---|---|---|
| 4,640,720 | A * | 2/1987 | Foxon | C30B 23/06 118/726 |
| 2007/0277866 | A1 | 12/2007 | Sander et al. | |
| 2017/0047499 | A1 | 2/2017 | Hussein | |
| 2017/0069818 | A1 | 3/2017 | Mitrovic et al. | |
| 2017/0356806 | A1 | 12/2017 | Takahashi et al. | |

(Continued)

FOREIGN PATENT DOCUMENTS

| | | | | |
|---|---|---|---|---|
| CH | 716359 | A2 * | 12/2020 | G04G 9/02 |
| EP | 1063687 | A2 * | 12/2000 | H01L 21/76846 |
| JP | 2009-539261 | A | 11/2009 | |

(Continued)

OTHER PUBLICATIONS

International Search Report mailed on May 17, 2022 issued in International Patent Application No. PCT/JP2022/009787, with English translation.

(Continued)

*Primary Examiner* — Jeff W Natalini
*Assistant Examiner* — Jacob Raul Marin
(74) *Attorney, Agent, or Firm* — Rimon P.C.

(57) ABSTRACT

A multilayer body of the present disclosure includes a phononic crystal layer and a metal layer. The phononic crystal layer has a plurality of recesses. The metal layer is disposed on or above the phononic crystal layer. Metal atoms of a kind identical to that of metal atoms contained in the metal layer are present inside the recesses.

10 Claims, 9 Drawing Sheets

(56) References Cited

U.S. PATENT DOCUMENTS

| | | | | |
|---|---|---|---|---|
| 2021/0313505 | A1 | 10/2021 | Fujikane et al. | |
| 2021/0381900 | A1* | 12/2021 | Carr .......................... | G01J 3/42 |

FOREIGN PATENT DOCUMENTS

| | | | | |
|---|---|---|---|---|
| JP | 2017-223644 A | 12/2017 | | |
| JP | 2018-082083 A | 5/2018 | | |
| JP | 7601518 B2 * | 12/2024 | ........ | H01M 10/0525 |
| WO | WO-2019204393 A1 * | 10/2019 | ......... | H10N 10/8556 |
| WO | 2020/174764 A1 | 9/2020 | | |

OTHER PUBLICATIONS

M. Nomura et al., "Impeded thermal transport in Si multiscale hierarchical architectures with phononic crystal nanostructures," Physical Review B 91, 205422 (2015).

* cited by examiner

MULTILAYER BODY, ELECTRONIC DEVICE, AND METHOD OF PRODUCING MULTILAYER BODY

This application is a continuation of PCT/JP2022/009787 filed on Mar. 7, 2022, which claims foreign priority of Japanese Patent Application No. 2021-050677 filed on Mar. 24, 2021, the entire contents of both of which are incorporated herein by reference.

BACKGROUND OF THE INVENTION

1. Field of the Invention

The present disclosure relates to a multilayer body, an electronic device, and a method of producing the multilayer body.

2. Description of Related Art

To date, materials having a phononic crystal have been known.

For example, US20170047499A1, US20170069818A1, and "Impeded thermal transport in Si multiscale hierarchical architectures with phononic crystal nanostructures", Physical Review B 91, 205422 (2015), Nomura et al., each disclose a periodic structure defined by a plurality of through holes. In the periodic structure, in a plan view of a thin film, the through holes are regularly arranged, with a periodicity of nanometer orders in a range of 1 nanometer (nm) to 1000 nm. This periodic structure is one type of the structure of the phononic crystal. A phononic crystal of this type has a periodic structure that has, as unit lattices, minimum units forming an array of through holes.

With this phononic crystal, thermal conductivity of a thin film can be reduced. This advantage of the phononic crystal can be applied to various usages. For example, JP2017-223644A discloses a thermal-type infrared sensor including a phononic crystal in a thin film shape.

SUMMARY OF THE INVENTION

From the viewpoint of reducing electric resistance of a multilayer body including a phononic crystal, there is room for reviewing the technology described above.

The present disclosure provides an advantageous technology from the viewpoint of reducing electric resistance of a multilayer body including a phononic crystal.

The present disclosure provides the multilayer body below.

A multilayer body including:

a phononic crystal layer having a plurality of recesses; and a metal layer disposed on or above the phononic crystal layer, wherein metal atoms of a kind identical to that of metal atoms contained in the metal layer are present inside the recesses.

The multilayer body of the present disclosure is advantageous from the viewpoint of reducing electric resistance.

DETAILED DESCRIPTION

Findings Serving as the Basis of the Present Disclosure

The thermal conductivity of a thin film can be reduced by making the thin film into a porous form, for example. Voids formed in the thin film due to the porous form reduce the thermal conductivity of the thin film. Meanwhile, with a phononic crystal, the thermal conductivity of a base material itself forming the thin film can be reduced, and the thermal conductivity is further expected to be reduced when compared with that of the thin film made into a porous form. Therefore, for example, it is conceivable that a layer having a phononic crystal and a metal layer are laminated to be used in an electronic device such as a thermal-type sensor.

Meanwhile, studies by the present inventors revealed that when a phononic crystal layer and a metal layer are laminated, the electric resistance of the multilayer body is likely to be high. In order to increase the value of the multilayer body, it is advantageous that the multilayer body has a low electric resistance. Thus, the present inventors obtained an idea of diffusing metal atoms in the metal layer toward the phononic crystal layer, to reduce the electric resistance of the multilayer body. Through trial-and-error under this idea, the present inventors found that, when the phononic crystal layer is configured such that the metal atoms are present at a specific position of the phononic crystal layer, the electric resistance of the multilayer body is easily reduced, and devised the multilayer body of the present disclosure.

Outline of One Aspect According to the Present Disclosure

The present disclosure provides the multilayer body below.

A multilayer body including:

a phononic crystal layer having a plurality of recesses; and a metal layer disposed on or above the phononic crystal layer, wherein metal atoms of a kind identical to that of metal atoms contained in the metal layer are present inside the recesses.

In the above multilayer body, since the phononic crystal layer is configured as above, the multilayer body easily has a low electric resistance.

EMBODIMENT OF THE PRESENT DISCLOSURE

Hereinafter, an embodiment of the present disclosure will be described with reference to the drawings. The embodiment described below is all comprehensive or specific examples. The numerical values, shapes, materials, components, arrangement positions of the components, connection forms, process conditions, steps, order of the steps, etc., shown in the following embodiment are examples, and are not intended to limit the present disclosure. In addition, among the components in the following embodiment, the components that are not described in the independent claims that represent broadest concepts are described as discretionary components. Each drawing is a schematic diagram, and is not necessarily exactly illustrated.

Embodiment 1

Figure 1:
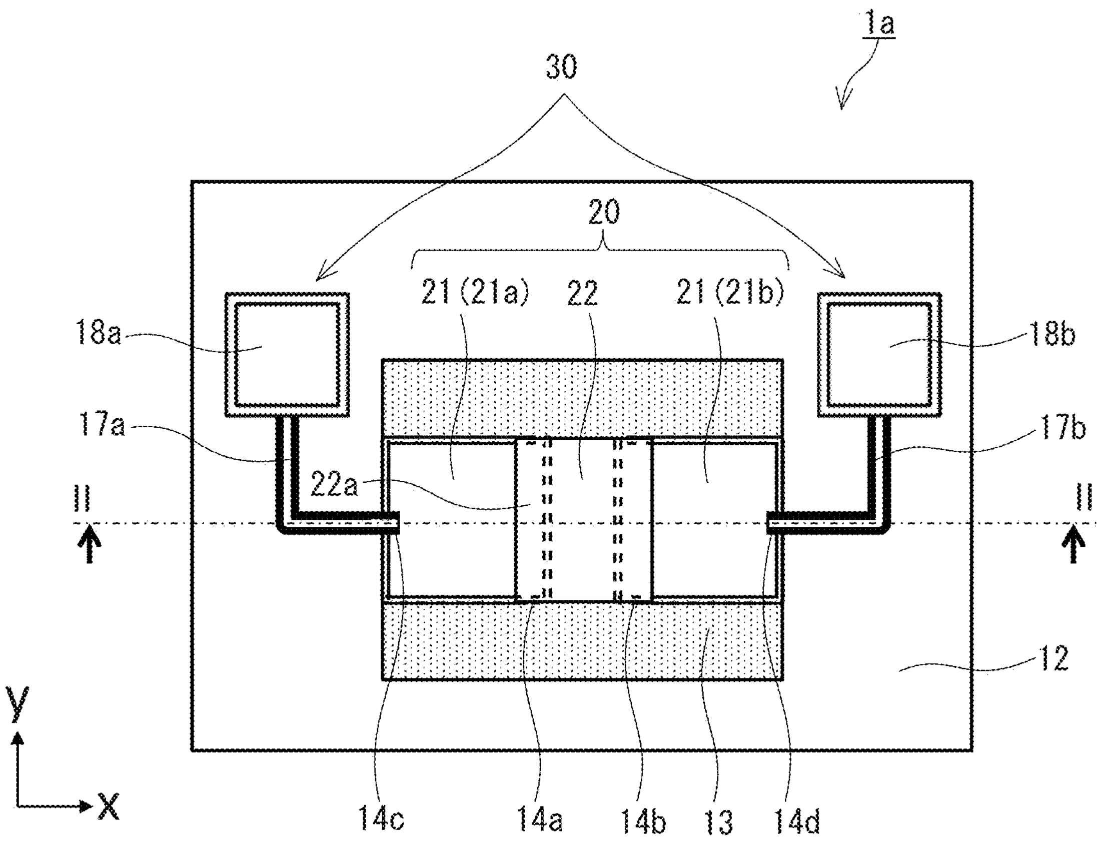
FIG. 1 is a plan view showing a phononic device of Embodiment 1.
Figure 2:
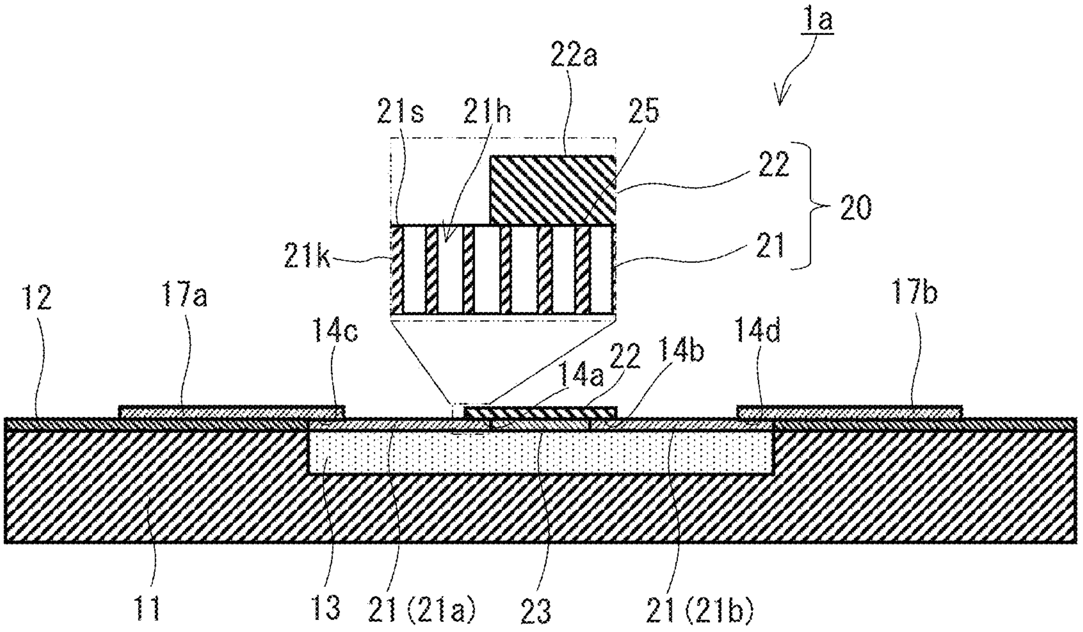
FIG. 2 is a cross-sectional view taken along II-II in FIG. 1.

FIG. 1 is a plan view showing a phononic device 1*a* of Embodiment 1. FIG. 2 is a cross-sectional view of the phononic device 1*a* taken along a line II-II in FIG. 1. As shown in FIGS. 1 and 2, the phononic device 1*a* includes a multilayer body 20. The multilayer body 20 includes a phononic crystal layer 21 and a metal layer 22. The phononic crystal layer 21 has a phononic crystal, and has a plurality of recesses 21*h* as shown in FIG. 2. The metal layer 22 is disposed on or above the phononic crystal layer 21. The metal layer 22 may be in direct contact with the phononic crystal layer 21, or another layer such as a joining layer may be present between the metal layer 22 and the phononic crystal layer 21. In the present specification, the expression of "on or above" is for convenience, and for example, a state where the metal layer 22 is positioned below the phononic crystal layer 21 in the gravity direction is also included in the meaning of this expression.

Metal atoms of a kind identical to that of metal atoms contained in the metal layer 22 are present inside the recesses 21*h*, for example. With this configuration, the electric resistance of the multilayer body 20 easily becomes low. As a result, the phononic device 1*a* easily exhibits a desired performance. For example, inside some of the plurality of recesses 21*h* positioned immediately below the metal layer 22, the metal atoms of the kind identical to that of the metal atoms contained in the metal layer 22 may be present. With this configuration, the electric resistance of the multilayer body 20 easily and more assuredly becomes low.

At a specific position of the phononic crystal layer 21, the concentration of the metal atoms of the kind identical to that of the metal atoms contained in the metal layer 22 is, for example, $4\times10^{21}$ atoms/$cm^3$ or more. The specific position is a position separated by nm from a surface 21*s* of the phononic crystal layer 21 to the inside of the phononic crystal layer 21, in the thickness direction of the phononic crystal layer 21. In this case, the electric resistance of the multilayer body 20 easily and more assuredly becomes low. The concentration of the metal atoms at the specific position of the phononic crystal layer 21 can be determined, for example, by performing TOF-SIMS while etching the multilayer body 20 by ion sputtering from a surface 22*a* of the metal layer 22 toward the phononic crystal layer 21 in the thickness direction of the metal layer 22.

The ion to be used in the ion sputtering above is not limited to a specific ion as long as etching of the multilayer body 20 is possible. The ion is $Cs^+$, for example. The primary ion to be used in TOF-SIMS is not limited to a specific ion as long as the concentration of the metal atoms in the multilayer body 20 can be acquired. The primary ion is $Bi_3^+$, for example.

At the specific position of the phononic crystal layer 21, the concentration of the metal atoms of the kind identical to that of the metal atoms contained in the metal layer 22 may be $5\times10^{21}$ atoms/$cm^3$ or more, may be $6\times10^{21}$ atoms/$cm^3$ or more, or may be $7\times10^{21}$ atoms/$cm^3$ or more. The concentration of the metal atoms at the specific position of the phononic crystal layer 21 is $5\times10^{22}$ atoms/$cm^3$ or less, for example.

The concentration of the metal atoms decreases gradually in association with increase in distance from the surface 21*s*, between the specific position above and the surface 21*s* in the thickness direction of the phononic crystal layer 21, for example. When such a result can be obtained by performing TOF-SIMS while etching the multilayer body the electric resistance of the multilayer body 20 easily and more assuredly becomes low.

In the phononic crystal layer 21, the relationship between the concentration of the metal atoms of the kind identical to that of the metal atoms contained in the metal layer 22 and the depth from the surface 21*s* of the phononic crystal layer 21 is not limited to a specific relationship. The phononic crystal layer 21 satisfies a condition of $y\geq100\exp(-0.2326x)$ in a range of $0\leq\leq24$, for example. In this condition, x is the numerical value portion when the depth in the phononic crystal layer 21 from the surface 21*s* of the phononic crystal layer 21 is expressed in nanometers. y is determined by performing exponential approximation, in a range of $0\leq x\leq24$, on the relationship between the percentage of the concentration of the metal atoms at a depth of x nanometers in the phononic crystal layer 21 relative to the concentration of the metal atoms at the surface 21*s*, and the depth x. When the phononic crystal layer 21 satisfies such a condition, the electric resistance of the multilayer body 20 easily and more assuredly becomes low.

In the multilayer body 20, an average value Ca of the concentration of the metal atoms in an intermediate portion 25 between the metal layer 22 and the phononic crystal layer 21 is not limited to a specific value. The average value Ca is larger than $3.68\times10^{22}$ atoms/$cm^3$, for example. In this case, the electric resistance of the multilayer body 20 easily and more assuredly becomes low. The intermediate portion 25 is present, for example, at the boundary or in the vicinity of the boundary between the metal layer 22 and the phononic crystal layer 21, between a depth d1 corresponding to a value at which the second derivative value of the concentration of the metal atoms relative to the depth becomes minimum, and a depth d2 at which the second derivative value becomes maximum. The average value Ca is determined by, for example, dividing the integrated value of the concentration of the metal atoms in a range from the depth d1 to the depth d2 by the absolute value of the difference between the depth d1 and the depth d2. The average value Ca may be $3.69\times10^{22}$ atoms/$cm^3$ or more, or may be $3.70\times10^{22}$ atoms/$cm^3$ or more. The average value Ca is $6.03\times10^{22}$ atoms/$cm^3$ or less, for example.

In the multilayer body 20, the absolute value $|d2-d1|$ is not limited to a specific value. The absolute value $|d2-d1|$ is 5 nm or more and 20 nm or less, for example.

The material forming the phononic crystal layer 21 is not limited to a specific material. The material forming the phononic crystal layer 21 is a semiconductor material, for example. The main component of the semiconductor material is not limited to a specific component. In the present specification, the main component means a component that is contained in the largest amount on a mass basis. The main component of the semiconductor material forming the phononic crystal layer 21 is Si, for example. The semiconductor material forming the phononic crystal layer 21 can contain a dopant such as B and P.

The metal atoms contained in the metal layer 22 are not limited to metal atoms of a specific kind. The metal atoms are aluminum (Al), for example. With this configuration, the metal layer 22 easily absorbs infrared radiation. The metal atoms contained in the metal layer 22 may be iron, may be nickel, may be chromium, may be cobalt, may be magnesium, may be tin, or may be zinc. The material forming the metal layer 22 may be a single metal, may be an alloy, or may be an electroconductive metal compound.

As shown in FIG. 2, in the phononic crystal layer 21, the plurality of recesses 21*h* are regularly arranged. The phononic crystal in the phononic crystal layer 21 may be a single crystal or may be a polycrystal. When the phononic crystal is a polycrystal, the phononic crystal has a plurality of domains in a plan view of the phononic crystal layer 21, and the phononic crystal in each domain is a single crystal. In other words, the phononic crystal in a polycrystal state is a complex of a plurality of phononic single crystals. In this case, in the plurality of domains, the plurality of recesses 21*h* are regularly arranged in different directions. In each domain, the orientations of the respective unit lattices are the same. In a plan view of the phononic crystal layer 21, the shapes of the respective domains may be the same as or different from each other. In a plan view of the phononic crystal layer 21, the sizes of the respective domains may be the same as or different from each other.

The ratio of the length of each recess 21*h* relative to the diameter of the recess 21*h* is not limited to a specific value. The length of the recess 21*h* is a length of the recess 21*h* in the thickness direction of the phononic crystal layer 21. This ratio is 3 or more, for example. This ratio may be 4 or more. This ratio is 20 or less, for example.

As shown in FIG. 2, each recess 21*h* extends along the normal direction of the surface 21*s* of the phononic crystal layer 21. The recess 21*h* may extend in parallel to the normal of the surface 21*s*, or may extend in parallel to a straight line forming an angle of, for example, 10° or less with respect to the normal of the surface 21*s*. The surface 21*s* is a surface of a solid portion 21*k* of the phononic crystal layer 21.

For example, each recess 21*h* penetrates the phononic crystal layer 21 in the thickness direction to form a through hole. Accordingly, for example, physical properties in the thickness direction of the phononic crystal layer 21 are less likely to vary. In the thickness direction of the phononic crystal layer 21, one end of the recess 21*h* may be open, and the other end of the recess 21*h* may be closed by the solid portion 21*k* of the phononic crystal layer 21.

An example of a method of producing the multilayer body 20 will be described. For example, the method of producing the multilayer body 20 includes applying a voltage, at a preliminary multilayer body 20*p* including a phononic crystal layer 21*p* and a metal layer 22*p*, to cause a current between the phononic crystal layer 21*p* and the metal layer 22*p*. The phononic crystal layer 21*p* and the metal layer 22*p* in the preliminary multilayer body are configured so as to be similar to the phononic crystal layer 21 and the metal layer 22, respectively. The phononic crystal layer 21*p* of the preliminary multilayer body 20*p* can be prepared by forming a plurality of recesses in a thin film by a method such as electron-beam lithography and block copolymer lithography, for example. The thin film can be formed by a method such as vacuum deposition, ion plating, sputtering, and chemical vapor deposition (CVD). The metal layer 22*p* of the preliminary multilayer body 20*p* can be formed on the thus-formed phononic crystal layer 21*p*, by a method such as vacuum deposition, ion plating, sputtering, and CVD, for example.

Figure 3:
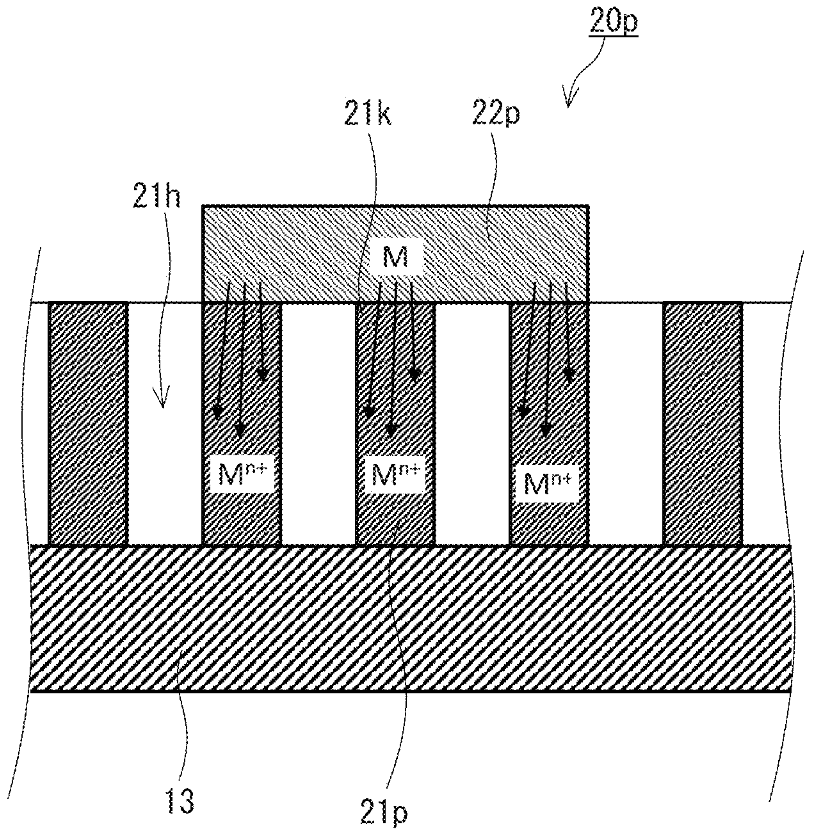
FIG. 3 is a cross-sectional view schematically showing diffusion of metal atoms from a metal layer into a phononic crystal layer.

The voltage above is not limited to a specific value as long as the multilayer body can be produced. The voltage is higher than the voltage necessary for driving the phononic device 1*a*. The voltage is a DC voltage, for example, and the direction in which the voltage is applied may be changed to a reverse direction in production of the multilayer body 20. FIG. 3 is a cross-sectional view schematically showing diffusion of metal atoms M from the metal layer 22*p* to the phononic crystal layer 21*p* caused by application of the voltage. As shown in FIG. 3, through application of the voltage, generation of Joule heat and generation of electric fields that induce electromigration are caused between the metal layer 22*p* and the phononic crystal layer 21*p*, and diffusion of the metal atoms M is caused. Accordingly, the metal atoms M are diffused to at least one selected from the group consisting of the recesses 21*h* and the solid portion 21*k*. The metal atoms M may be diffused only to the recesses 21*h*, may be diffused only to the solid portion 21*k*, or may be diffused both of the recesses 21*h* and the solid portion 21*k*.

Through application of the voltage, for example, as described above, the phononic crystal layer 21 is doped with the metal atoms M such that the concentration of the metal atoms M at the specific position of the phononic crystal layer 21 becomes $4\times10^{21}$ atoms/$cm^3$ or more.

Through application of the voltage, for example, the phononic crystal layer 21 can satisfy the condition of $y \geq 100 \exp(-0.2326x)$ in a range of $0 \leq x \leq 24$, as described above.

Through application of the voltage, the average value Ca of the concentration of the metal atoms in the intermediate portion 25 between the metal layer 22 and the phononic crystal layer 21 may become larger than $3.68\times10^{22}$ atoms/$cm^3$.

Figure 4:
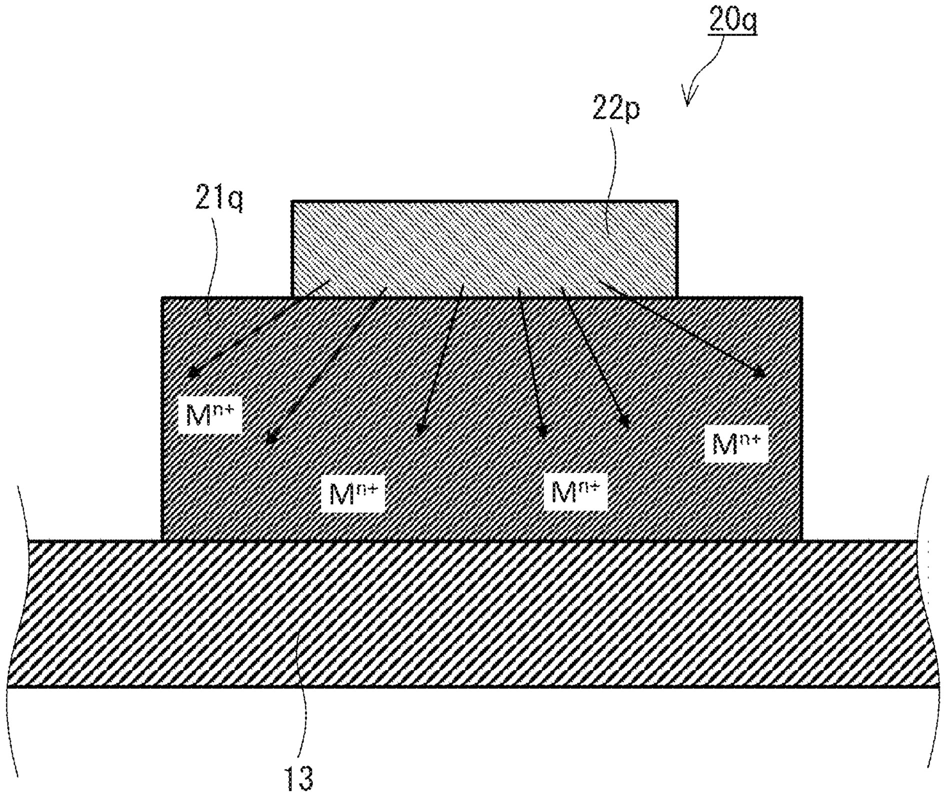
FIG. 4 is a cross-sectional view schematically showing diffusion of metal atoms into layers not having a phononic crystal.

As shown in FIG. 3, through application of the voltage, the metal atoms M are diffused along the length direction of the recesses 21*h*, whereby local diffusion of the metal atoms M is caused. For example, diffusion of the metal atoms M is caused at a local portion immediately below the metal layer 22*p* of the phononic crystal layer 21*p*. Accordingly, the electric resistance in a desired portion of the phononic crystal layer 21 can be reduced. As a result, the electric resistance of the multilayer body 20 easily becomes low. FIG. 4 schematically shows diffusion of the metal atoms M when the voltage is applied to a preliminary multilayer body 20*q*, in a manner similar to that for the preliminary multilayer body 20*p*. The preliminary multilayer body 20*q* is configured so as to be similar to the preliminary multilayer body 20*p* except that the phononic crystal layer 21*p* is changed to a layer 21*q* not having the phononic crystal. As shown in FIG. 4, when the voltage is applied to the preliminary multilayer body 20*q*, the metal atoms M are diffused not only to a local portion of the layer 21*q* immediately below the metal layer 22*p* but also over a wider range.

It is also conceivable to promote diffusion of the metal atoms M from the metal layer 22*p* to the phononic crystal layer 21*p* by a method such as performing heat treatment on the preliminary multilayer body 20*p*. However, in this case, the heat treatment may have influence on the entirety of the phononic device 1*a* including the multilayer body 20. Meanwhile, according to the method above, heat treatment is not necessary, and thus, it is possible to prevent the treatment for diffusion of the metal atoms M from influencing the entirety of the phononic device 1*a*.

As shown in FIGS. 1 and 2, the phononic device 1*a* includes a base substrate 11, a thin film 12, a low thermal conduction layer 13, a first phononic crystal layer 21*a*, a second phononic crystal layer 21*b*, a high electric resistance layer 23, and the metal layer 22. The first phononic crystal layer 21*a* and the second phononic crystal layer 21*b* are the phononic crystal layer 21 in the multilayer body 20. The phononic device 1*a* further includes a first wiring 17*a*, a second wiring 17*b*, a first signal processing circuit 18*a*, and a second signal processing circuit 18*b*.

The thin film 12 is formed on the base substrate 11. The base substrate 11 is typically formed from a semiconductor. The semiconductor is Si, for example. As shown in FIG. 1, the thin film 12 is formed so as to surround the first phononic crystal layer 21*a*, the second phononic crystal layer 21*b*, and the high electric resistance layer 23, for example. The basic composition of the thin film 12 is the same as those of the phononic crystal layer 21 and the high electric resistance layer 23, for example, and is typically formed from a semiconductor. The thin film 12 is an Si film, for example. The thin film 12 may be a single crystal material, may be a polycrystal material, or may be an amorphous material. The first phononic crystal layer 21*a* and the second phononic crystal layer 21*b* contain a dopant such as B or P, for example. Therefore, the electric resistances of the first phononic crystal layer 21*a* and the second phononic crystal layer 21*b* are lower than the electric resistances of the thin film 12 and the high electric resistance layer 23. The high electric resistance layer 23 is formed between the first phononic crystal layer 21*a* and the second phononic crystal layer 21*b*. The high electric resistance layer 23 is not limited to a specific material as long as the high electric resistance layer 23 has an electric resistance higher than the electric resistances of the first phononic crystal layer 21*a* and the second phononic crystal layer 21*b*. For example, in the high electric resistance layer 23, the concentration of the metal atoms of the kind identical to that of the metal atoms contained in the metal layer 22 is lower than the concentrations of the metal atoms in the first phononic crystal layer 21*a* and the second phononic crystal layer 21*b*. The high electric resistance layer 23 is an intrinsic semiconductor, for example.

For example, the first phononic crystal layer 21*a* includes an n-type semiconductor, and the second phononic crystal layer 21*b* includes a p-type semiconductor. As shown in FIG. 2, for example, the high electric resistance layer 23 is disposed so as to be flush with the first phononic crystal layer 21*a* and the second phononic crystal layer 21*b*, between the first phononic crystal layer 21*a* and the second phononic crystal layer 21*b*. In addition, the metal layer 22 is disposed on the high electric resistance layer 23 so as to extend across the first phononic crystal layer 21*a* and the second phononic crystal layer 21*b*. Both of the first phononic crystal layer 21*a* and the second phononic crystal layer 21*b* may include an n-type semiconductor, or both of the first phononic crystal layer 21*a* and the second phononic crystal layer 21*b* may include a p-type semiconductor.

The low thermal conduction layer 13 is formed on the base substrate 11. The thermal conductivity at normal temperature of the low thermal conduction layer 13 is 5 $Wm^{-1}K^{-1}$ or less, for example. The low thermal conduction layer 13 may be a layer formed from a solid material, such as $SiO_2$, having a low thermal conductivity, may be an air layer, or may be a vacuum layer. For example, the low thermal conduction layer 13 is formed below the first phononic crystal layer 21*a*, the second phononic crystal layer 21*b*, and the high electric resistance layer 23. The low thermal conduction layer 13 may also be formed below the thin film 12. In the present specification, the normal temperature is 20° C.±15° C. according to the Japanese Industrial Standards (JIS) Z 8703.

The first phononic crystal layer 21*a* and the second phononic crystal layer 21*b* are disposed on the low thermal conduction layer 13, for example. The metal layer 22 is disposed on the first phononic crystal layer 21*a*, the second phononic crystal layer 21*b*, and the high electric resistance layer 23, and covers a part of the phononic crystals of the first phononic crystal layer 21*a* and the second phononic crystal layer 21*b*. Accordingly, a connection portion 14*a* is formed between the metal layer 22 and the first phononic crystal layer 21*a*, and a connection portion 14*b* is formed between the metal layer 22 and the second phononic crystal layer 21*b*. One of the first phononic crystal layer 21*a* and the second phononic crystal layer 21*b* may be changed to a layer not having the phononic crystal.

As shown in FIG. 1, the first wiring 17*a*, the second wiring 17*b*, the first signal processing circuit 18*a*, and the second signal processing circuit 18*b* are disposed on the thin film 12. Each of the first wiring 17*a* and the second wiring 17*b* is formed from a metal or a doped semiconductor having electroconductivity. The first wiring 17*a* and the second wiring 17*b* are each formed as an Al film, for example. The first wiring 17*a* and the second wiring 17*b* are in contact with the first phononic crystal layer 21*a* and the second phononic crystal layer 21*b*, respectively. Accordingly, a connection portion 14*c* is formed between the first wiring 17*a* and the first phononic crystal layer 21*a*, and a connection portion 14*d* is formed between the second wiring 17*b* and the second phononic crystal layer 21*b*. Electric connection between the first wiring 17*a* and the first phononic crystal layer 21*a*, and electric connection between the second wiring 17*b* and the second phononic crystal layer 21*b* are ensured. Each of the first signal processing circuit 18*a* and the second signal processing circuit 18*b* can have a configuration similar to that of a known signal processing circuit capable of processing an electric signal.

As shown in FIG. 1, for example, the width, i.e., the length in the y-axis direction, of each of the first phononic crystal layer 21*a*, the second phononic crystal layer 21*b*, the high electric resistance layer 23, and the metal layer 22 is not limited to a specific value. These widths may be the same as or different from each other. The width of the low thermal conduction layer 13 is larger than the widths of the first phononic crystal layer 21*a*, the second phononic crystal layer 21*b*, the high electric resistance layer 23, and the metal layer 22.

The phononic device 1*a* functions as an infrared sensor, for example.

Due to the presence of the plurality of recesses 21*h* in the phononic crystal layer 21, the areas of the connection portions 14*a* and 14*b* between the phononic crystal layer 21 and the metal layer 22 are smaller than those when the phononic crystal layer 21 is replaced by a layer not having the phononic crystal. Therefore, the contact electric resistances at the connection portions 14*a* and 14*b* easily become high. However, in the multilayer body 20 of the phononic device 1*a*, as described above, the metal atoms M contained in the metal layer 22 are locally diffused in the phononic crystal layer 21, and thus, the contact electric resistances at the connection portions 14*a* and 14*b* are reduced.

Due to the presence of the plurality of recesses 21*h* in the phononic crystal layer 21, the contact electric resistances at the connection portion 14*c* and the connection portion 14*d* are also considered to easily become high. For example, when the first wiring 17*a* and the second wiring 17*b* are metal layers, metal atoms contained in these metal layers can be locally diffused into the phononic crystal layer 21. Accordingly, the contact electric resistance at the connection portions 14*c* and 14*d* can also be reduced. The compositions of the material forming the metal layer 22 and the material forming the first wiring 17*a* and the second wiring 17*b* may be the same as or different from each other.

An example of a method of reducing the contact electric resistances at the connection portions 14*a*, 14*b*, 14*c*, and 14*d* will be described. The first signal processing circuit 18*a* and the second signal processing circuit 18*b* are configured such that a DC voltage can be applied between the first signal processing circuit 18*a* and the second signal processing circuit 18*b*, for example. The first signal processing circuit 18*a* and the second signal processing circuit 18*b* are configured such that a voltage higher than the voltage necessary for driving the phononic device 1*a* can be applied between the first signal processing circuit 18*a* and the second signal processing circuit 18*b*. This voltage is V or more, for example. When such a voltage is applied between the first signal processing circuit 18*a* and the second signal processing circuit 18*b*, a current is caused in a circuit 30. The circuit 30 is composed of the first signal processing circuit 18*a*, the first wiring 17*a*, the connection portion 14*c*, the first phononic crystal layer 21*a*, the connection portion 14*a*, the metal layer 22, the connection portion 14*b*, the second phononic crystal layer 21*b*, the connection portion 14*d*, the second wiring 17*b*, and the second signal processing circuit 18*b*. Accordingly, in the portions corresponding to the connection portions 14*a*, 14*b*, 14*c*, and 14*d*, metal atoms contained in the metal layer 22, the first wiring 17*a*, and the second wiring 17*b* are diffused toward the phononic crystal layer 21 due to Joule heat and electric fields. As a result, the contact electric resistances at the connection portions 14*a*, 14*b*, 14*c*, and 14*d* are reduced.

As described above, the electric resistance of the high electric resistance layer 23 is higher than the electric resistances of the first phononic crystal layer 21*a* and the second phononic crystal layer 21*b*. Therefore, even when the voltage is applied as above, substantially no current is caused in the high electric resistance layer 23, and the metal atoms contained in the metal layer 22 are hardly diffused into the high electric resistance layer 23. A thin film such as a silicon oxide thin film and a silicon nitride thin film may be formed between the high electric resistance layer 23 and the metal layer 22.

Using a different power supply without using the first signal processing circuit 18*a* and the second signal processing circuit 18*b*, the voltage above may be applied between the first wiring 17*a* and the second wiring 17*b* of the circuit 30. In this case, the first signal processing circuit 18*a* and the second signal processing circuit 18*b* need not be configured such that a high voltage can be applied therebetween, and restriction in designing the first signal processing circuit 18*a* and the second signal processing circuit 18*b* can be reduced.

As described above, an electronic device, such as the phononic device 1*a*, including the multilayer body 20 can be provided. The electronic device including the multilayer body 20 is not limited to the phononic device 1*a*. The electronic device including the multilayer body 20 may be an electronic device other than the phononic device 1*a*.

EXAMPLE

Hereinafter, the multilayer body of the present embodiment will be described in more detail with reference to Example. However, the multilayer body of the present embodiment is not limited to each aspect shown in Example below.

Sample 1

A silicon substrate having an $SiO_2$ layer on one principal surface was prepared. An Si film having a thickness of 100 nm was formed by a vapor deposition method on the $SiO_2$ layer of the silicon substrate. The Si film was a film of single silicon not containing impurities. Unnecessary portions of the Si film were removed by selective etching so as to leave the Si layer having a rectangular shape of which both ends were connected to the surrounding Si film. Next, a plurality of through holes regularly arranged in the in-plane direction of the Si layer were formed in the Si layer by electron-beam lithography or block copolymer lithography, whereby a phononic crystal structure was provided to the Si layer. The diameter of each through hole was about 26 nm, and the distance between the centers of through holes adjacent to each other in the in-plane direction of the Si layer was about 38 nm. Next, portions, excluding a center portion, of the Si layer having the rectangular shape were doped. The portion in contact with one end of the center portion in the longitudinal direction of the Si layer was doped into the p-type, and the portion in contact with the other end of the center portion was doped into the n-type. Accordingly, the Si layer having the rectangular shape had a p-type portion, a non-doped portion, and an n-type portion in the longitudinal direction in this order. An Al layer was formed by a vapor deposition method so as to continuously cover the non-doped portion, a part of the p-type portion, and a part of the n-type portion of the Si layer. Next, a DC voltage of 70 V was applied between both ends of the Si layer having the rectangular shape. At a time during application of the DC voltage, the direction of voltage was reversed. In this manner, Sample 1 was prepared.

Sample 2

Sample 2 was prepared in a similar manner to that in Sample 1 except that the DC voltage was not applied between both ends of the Si layer having the rectangular shape.

Sample 3

Sample 3 was prepared in a similar manner to that in Sample 1 except that the phononic crystal structure was not provided to the Si layer.

Sample 4

Sample 4 was prepared in a similar manner to that in Sample 2 except that the phononic crystal structure was not provided to the Si layer.

Figure 6:
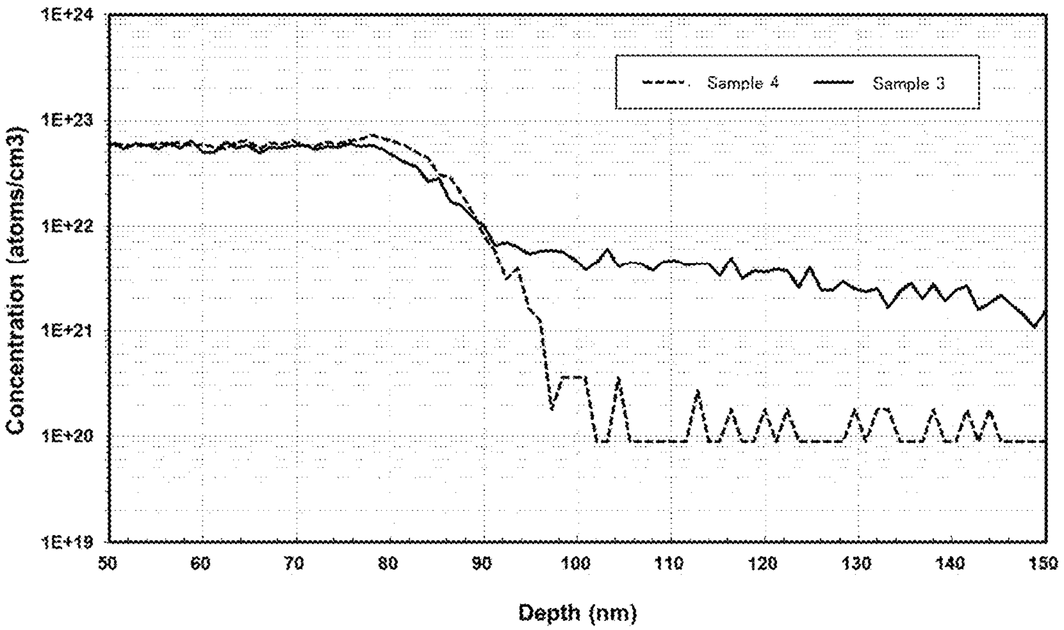
FIG. 6 is a graph showing the Al concentration, in Samples 3 and 4, obtained according to TOF-SIMS.
Figure 7A:
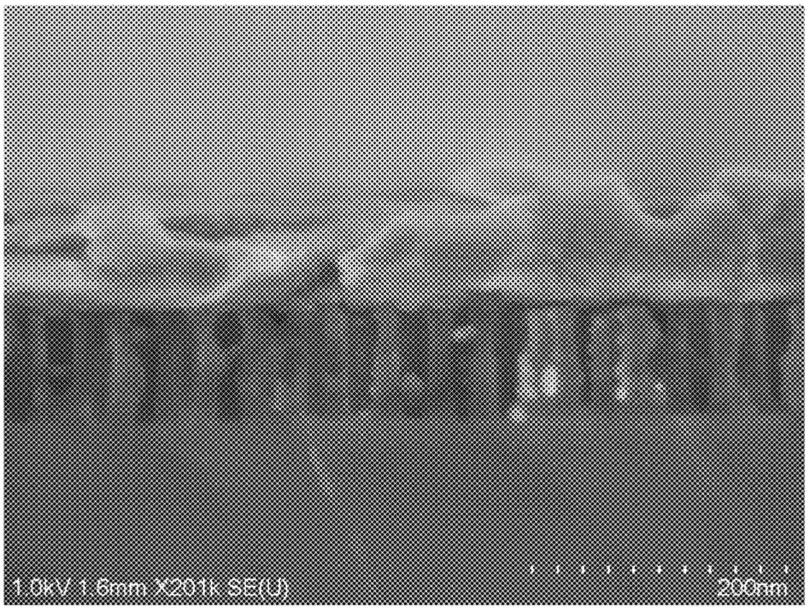
FIG. 7A is a scanning electron microscope (SEM) photograph of a cross section of Sample 1.
Figure 7B:
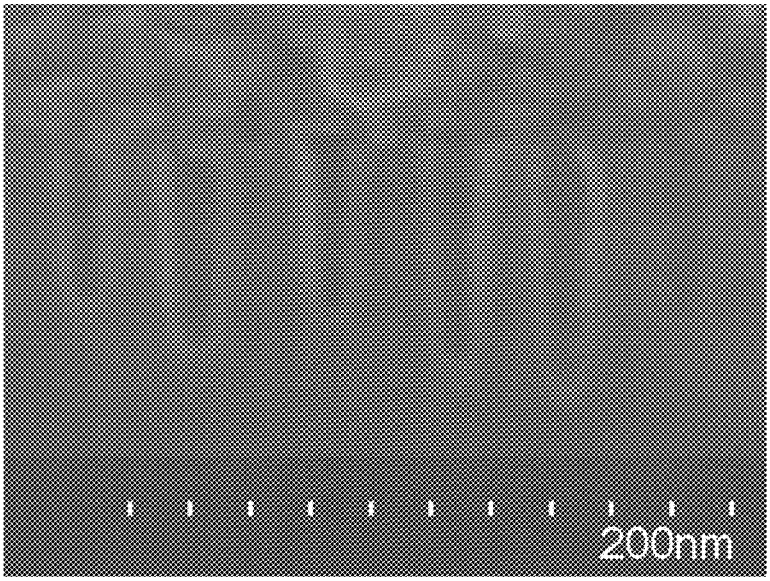
FIG. 7B is an SEM photograph of a cross section of another sample.

Using a TOF-SIMS device, i.e., TOF.SIMS 5, manufactured by IONTOF, with respect to Sample 1, Sample 2, Sample 3, and Sample 4, TOF-SIMS was performed on the portion where the Al layer and the p-type portion or the n-type portion overlap each other. TOF-SIMS was performed while the sample was etched by ion sputtering from the surface of the Al layer toward the p-type portion or the n-type portion. $Cs^+$ was used for ion sputtering, and $Bi_3^+$ was used as the primary ion for TOF-SIMS. From the results of TOF-SIMS, the concentration of Al in the thickness direction of each sample was obtained. FIG. shows the results regarding Samples 1 and 2, and FIG. 6 shows the results regarding Samples 3 and 4. FIG. 7A shows an SEM photograph of a cross section of Sample 1. FIG. 7B shows an SEM photograph of another sample prepared in a similar manner to that in Sample 2.

The electric resistivity between both ends of the Si layer having the rectangular shape in Samples 1, 2, and 4 was measured. This measurement was performed at normal temperature. Table 1 shows the results.

Figure 5:
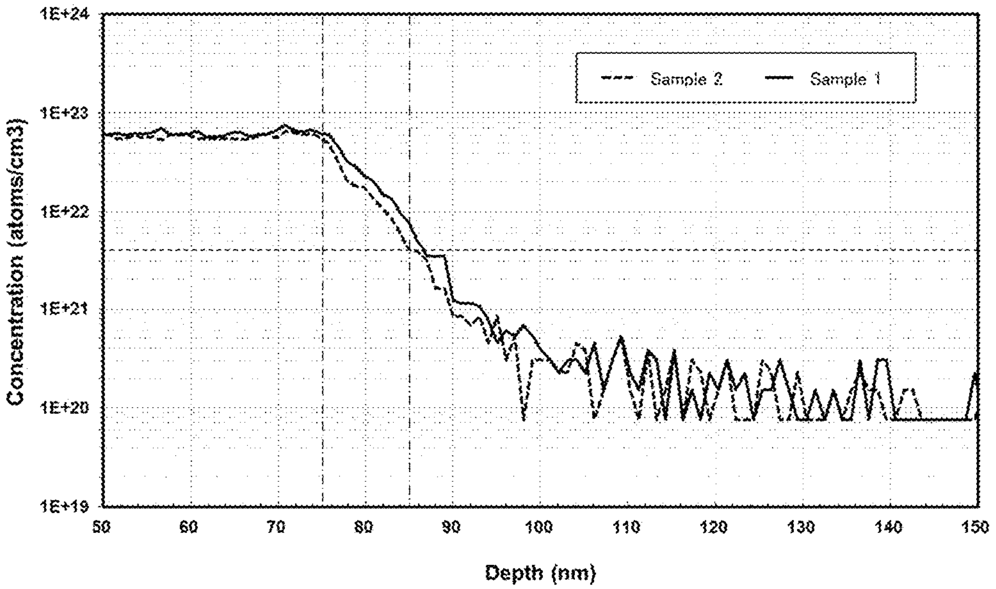
FIG. 5 is a graph showing the Al concentration, in Samples 1 and 2, obtained according to time-of-flight secondary ion mass spectrometry (TOF-SIMS).

As shown in FIG. 5, it is understood that the graphs regarding Samples 1 and 2 from a depth of 0 nm, which is the surface of the Al layer, to a depth of 75 nm correspond to the Al layer, and Al was detected at a high concentration of about $6\times10^{22}$ atoms/cm$^3$. The one-dot chain line in FIG. 5 indicates the depth of 75 nm. In the graphs regarding Samples 1 and 2, the Al concentration decreases in accordance with increase in depth, at a depth of 75 nm or more. It is understood that the graphs regarding Samples 1 and 2 at the depth of nm or more correspond to the Si layer having the phononic crystal. Thus, the position of the boundary between the Al layer and the Si layer can be determined from the graphs regarding Samples 1 and 2. In the graph regarding Sample 2, the Al concentration at a position separated by 10 nm from the boundary between the Al layer and the Si layer to the inside of the Si layer was less than $4\times10^{21}$ atoms/cm$^3$. Meanwhile, in the graph regarding Sample 1, the Al concentration at the position separated by 10 nm from the boundary between the Al layer and the Si layer to the inside of the Si layer was $4\times10^{21}$ atoms/cm$^3$ or more, and was about twice that of Sample 2. The two-dot chain line in FIG. 5 corresponds to the position separated by 10 nm from the boundary between the Al layer and the Si layer to the inside of the Si layer. The broken line in FIG. 5 corresponds to the Al concentration of $4\times10^{21}$ atoms/cm$^3$. Comparison between the graph regarding Sample 1 and the graph regarding Sample 2 suggests that, through voltage application, Al contained in the Al layer was diffused into the Si layer having the phononic crystal.

When the measurement principle of TOF-SIMS is taken into consideration, in a case where the target of TOF-SIMS has the phononic crystal structure, it is conceivable that the measurement sensitivity of TOF-SIMS may not necessarily be high due to the presence of through holes in the phononic crystal structure.

As shown in FIG. 6, it is understood that the graphs regarding Samples 3 and 4 from a depth of 0 nm, which is the surface of the Al layer, to a depth of 80 nm correspond to the Al layer, and Al was detected at a high concentration of about $6\times10^{22}$ atoms/cm$^3$. In the graphs regarding Samples 3 and 4, the Al concentration decreases in accordance with increase in depth, at a depth of 80 nm or more. It is understood that the graphs regarding Samples 3 and 4 at the depth of 80 nm or more correspond to the Si layer. In the graph regarding Sample 4, the Al concentration at a position separated by 20 nm from the boundary between the Al layer and the Si layer to the inside of the Si layer was a low concentration of about $3\times10^{20}$ atoms/cm$^3$. Meanwhile, in the graph regarding Sample 3, the Al concentration at the position separated by 20 nm from the boundary between the Al layer and the Si layer to the inside of the Si layer was a concentration of $4\times10^{21}$ atoms/cm$^3$ or more. Comparison between the graph regarding Sample 3 and the graph regarding Sample 4 suggested that, through voltage application, Al contained in the Al layer was diffused into the Si layer. In Samples 3 and 4, the Si layer does not have the phononic crystal structure, and thus, it is considered that the measurement sensitivity of TOF-SIMS is high. It is understood that the Al concentration in the Si layer is significantly different between Samples 3 and 4. It is inferred that such a large difference in the Al concentration also occurs in Samples 1 and 2.

As shown in FIG. 7A, in Sample 1, Al is present inside the through holes in the Si layer having the phononic crystal. It is also inferred that, due to the presence of Al inside the through holes, the difference in the Al concentration in the phononic crystal layers of Samples 1 and 2 measured by TOF-SIMS was smaller than the difference in the Al concentration in the Si layers of Samples 3 and 4. Meanwhile, the presence of Al inside the through holes is considered to be able to promote diffusion of Al into the solid portion of the Si layer having the phononic crystal. As shown in FIG. 7B, in another sample prepared in a similar manner to that in Sample 2, Al inside the through holes of the Si layer having the phononic crystal was not able to be confirmed by visual observation.

As shown in Table 1, the electric resistivity between both ends of the Si layer in Sample 2 was 24 mΩ·cm, whereas the electric resistivity between both ends of the Si layer in Sample 1 was 5.4 mΩ·cm. The electric resistivity between both ends of the Si layer in Sample 4 was 5.8 mΩ·cm. The electric resistivity between both ends of the Si layer in Sample 1 was lower than the electric resistivity between both ends of the Si layer in Sample 4 including the Si layer not having the phononic crystal. It is suggested that, through application of the voltage between the Si layer having the phononic crystal and the Al layer, Al is diffused from the Al layer and the contact electric resistance between the Al layer and the Si layer can be significantly reduced.

TABLE 1

| | Electric resistivity between both ends of Si layer [mΩ · cm] |
|---|---|
| Sample 1 | 5.4 |
| Sample 2 | 24 |
| Sample 4 | 5.8 |

Figure 8:
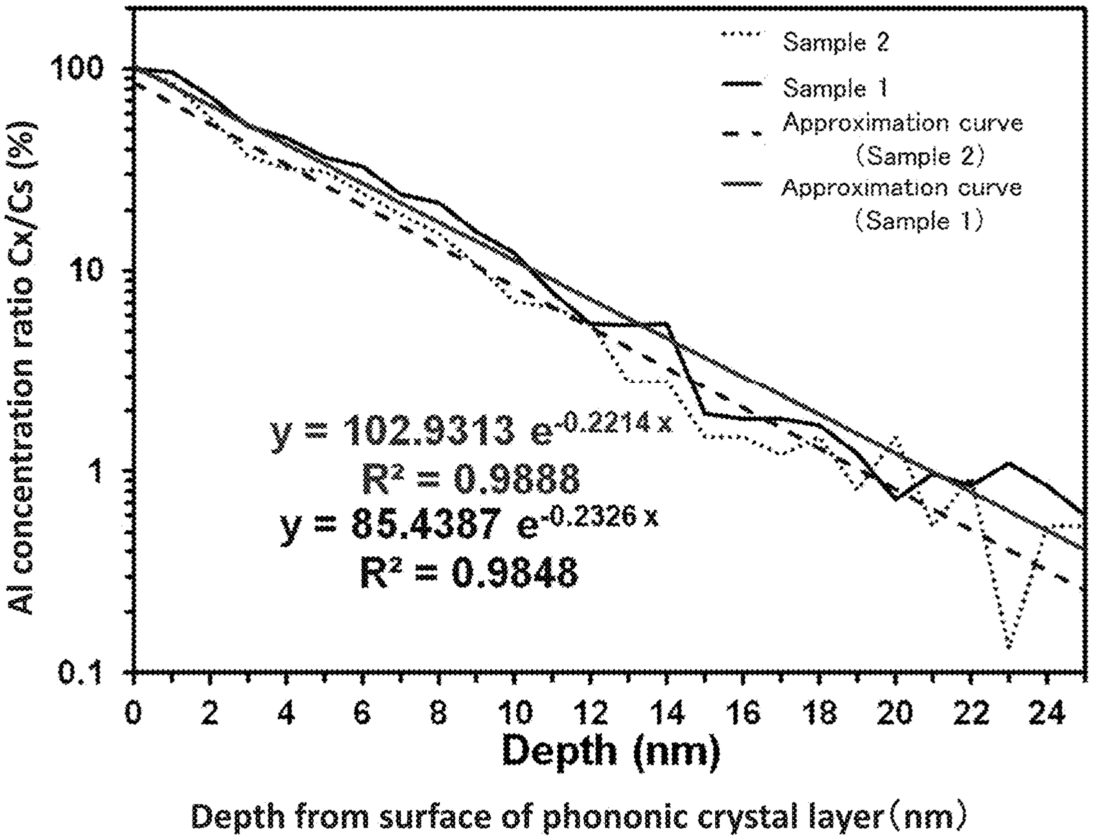
FIG. 8 is a graph showing a relationship between the percentage of the Al concentration at a predetermined depth of the phononic crystal layer relative to the Al concentration at the surface of the phononic crystal layer and the depth from the surface of the phononic crystal layer, in Samples 1 and 2.

FIG. 8 is a graph showing a relationship between a ratio Cx/Cs of an Al concentration Cx relative to an Al concentration Cs and the depth from the surface of the Si layer having the phononic crystal, in Samples 1 and 2. The Al concentration Cs is the Al concentration at the surface of the Si layer having the phononic crystal. The Al concentration Cx is the Al concentration at a depth of x nanometers in the Si layer having the phononic crystal. In FIG. 8, the approximation curve shown as a solid line was determined by performing exponential approximation, in $0\leq x\leq 24$, on the relationship between the ratio Cx/Cs and the depth of x nanometers in Sample 1. This approximation curve was represented by $y=102.9313\exp(-0.2214x)$. In FIG. 8, the approximation curve shown as a broken line was determined by performing exponential approximation, in on the relationship between the ratio Cx/Cs and the depth of x nanometers in Sample 2. This approximation curve was represented by $y=85.4387\exp(-0.2326x)$. With reference to FIG. 8, the Si layer having the phononic crystal in Sample 1 satisfied the condition of $y \geq 100 \exp(-0.2326x)$ in a range of $0 \leq x \leq 24$. Meanwhile, the Si layer having the phononic crystal in Sample 2 did not satisfy this condition.

Figure 9:
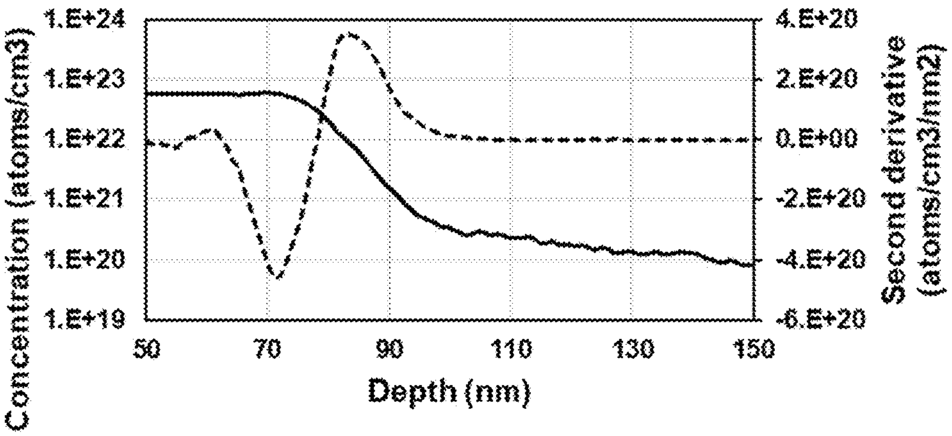
FIG. 9 is a graph showing the Al concentration and the second derivative value of the Al concentration relative to the depth, in Sample 1.

FIG. 9 is a graph showing the Al concentration and the second derivative value of the Al concentration relative to the depth, in Sample 1. In FIG. 9, the graph in a solid line indicates the Al concentration, and the graph in a broken line indicates the second derivative value of the Al concentration relative to the depth. In Sample 1 and Sample 2, on the basis of the second derivative value of the Al concentration relative to the depth, an intermediate portion between the Al layer and the Si layer having the phononic crystal was defined as the portion between the depth d1 and the depth d2. The depth d1 is the depth corresponding to the minimum value of the second derivative value of the Al concentration relative to the depth, and the depth d2 is the depth corresponding to the maximum value of the second derivative value. The average value Ca of the Al concentration in the intermediate portion was determined by dividing the integrated value of the Al concentration between the depth d1 and the depth d2 by the absolute value $|d2-d1|$. Table 2 shows the results.

TABLE 2

| Sample | Depth d1 (nm) | Depth d2 (nm) | $\|d2-d1\|$ (nm) | Average value Ca (atoms/cm$^3$) of Al concentration |
|---|---|---|---|---|
| Sample 1 | 72.3 | 84.4 | 12.1 | $3.72 \times 10^{22}$ |
| Sample 2 | 71.3 | 82.4 | 11.1 | $3.68 \times 10^{22}$ |

Although an embodiment of the present disclosure has been described above, the present disclosure is not limited to the embodiment in any way. For example, a metal film may be provided so as to cover a phononic crystal layer, such as in a form in which a phononic crystal layer is provided in an upper part of a metal film. Thus, the depth direction of the recesses in the phononic crystal layer is not limited to being perpendicular to the base substrate, either. The recess is not limited to a through hole, and in addition, the shape of the hole is not limited, either.

INDUSTRIAL APPLICABILITY

The multilayer body of the present disclosure is useful for various phononic devices, such as an infrared sensor, having a connection portion in which a phononic crystal layer and a metal layer are connected.

What is claimed is:

1. A multilayer body comprising:
a phononic crystal layer having a plurality of recesses; and
a metal layer disposed on or above the phononic crystal layer, wherein
metal atoms of a kind identical to that of metal atoms contained in the metal layer are present inside the recesses, and
a relationship between a concentration of the metal atoms in the phononic crystal layer and a depth from a surface of the phononic crystal layer satisfies
$y \geq 100 \exp(-0.2326x)$ in a range of $0 \leq x \leq 24$,
where x represents a depth, in nanometers, from the surface of the phononic crystal layer, and y represents a percentage value representing a ratio of a concentration of the metal atoms at a depth of x nanometers in the phononic crystal layer relative to a concentration of the metal atoms at the surface of the phononic crystal layer.

2. The multilayer body according to claim 1, wherein
a concentration of the metal atoms at a position separated by 10 nm from a surface of the phononic crystal layer to an inside of the phononic crystal layer in a thickness direction of the phononic crystal layer is $4 \times 10^{21}$ atoms/cm$^3$ or more.

3. The multilayer body according to claim 2, wherein
the concentration of the metal atoms decreases gradually in association with increase in distance from the surface, between the position and the surface of the phononic crystal layer in the thickness direction of the phononic crystal layer.

4. The multilayer body according to claim 1, wherein
an average value of a concentration of the metal atoms in an intermediate portion between the metal layer and the phononic crystal layer is larger than $3.68 \times 10^{22}$ atoms/cm$^3$.

5. The multilayer body according to claim 1, wherein
the plurality of recesses are regularly arranged.

6. The multilayer body according to claim 1, wherein
a ratio of a length of each recess in a thickness direction of the phononic crystal layer relative to a diameter of the recess is 3 or more.

7. The multilayer body according to claim 1, wherein
each recess extends along a normal direction of the surface of the phononic crystal layer.

8. The multilayer body according to claim 1, wherein
the metal atoms are aluminum.

9. The multilayer body according to claim 1, further comprising
a high electric resistance layer, wherein
the phononic crystal layer has a first phononic crystal layer including an n-type semiconductor and a second phononic crystal layer including a p-type semiconductor,
the high electric resistance layer is disposed so as to be flush with the first phononic crystal layer and the second phononic crystal layer, between the first phononic crystal layer and the second phononic crystal layer, and
the metal layer is disposed on the high electric resistance layer so as to extend across the first phononic crystal layer and the second phononic crystal layer.

10. An electronic device comprising the multilayer body according to claim 1.

* * * * *